(12) United States Patent
Wei et al.

(10) Patent No.: US 9,957,362 B2
(45) Date of Patent: May 1, 2018

(54) PRINTABLE PROCESS FOR FORMING A MULTI-LAYERED GAS BARRIER LAMINATE FILM

(71) Applicant: Industrial Technology Research Institute, Hsinchu (TW)

(72) Inventors: Hsiao-Fen Wei, New Taipei (TW);
Liang-You Jiang, New Taipei (TW);
Pao-Ming Tsai, Kaohsiung (TW);
Jhen-Hao Jiang, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 230 days.

(21) Appl. No.: 14/720,833

(22) Filed: May 24, 2015

(65) Prior Publication Data
US 2015/0252161 A1    Sep. 10, 2015

Related U.S. Application Data

(62) Division of application No. 12/618,792, filed on Nov. 16, 2009, now Pat. No. 9,073,287.

(Continued)

(51) Int. Cl.
*B32B 3/02*    (2006.01)
*B32B 9/00*    (2006.01)
(Continued)

(52) U.S. Cl.
CPC .............. *C08J 7/045* (2013.01); *B05D 7/56* (2013.01); *B32B 3/10* (2013.01); *B32B 3/263* (2013.01);
(Continued)

(58) Field of Classification Search
None
See application file for complete search history.

(56) References Cited

U.S. PATENT DOCUMENTS 5,770,301 A * 6/1998 Murai ..................... B32B 27/08
427/387
2004/0053070 A1* 3/2004 Sawai ................. H01L 51/5253
428/690

(Continued)

FOREIGN PATENT DOCUMENTS

TW    200711833    4/2007
TW    200830620    7/2008
TW    200840708    10/2008

OTHER PUBLICATIONS

"Office Action of Taiwan Counterpart Application," dated Apr. 14, 2015, p. 1-p. 5.

*Primary Examiner* — Gerard Higgins
*Assistant Examiner* — Sathavaram I Reddy
(74) *Attorney, Agent, or Firm* — JCIPRNET

(57) ABSTRACT

The present invention employs the printable process to fabricate a multi-layered laminate gas barrier film. According to an embodiment of the present invention, after providing a plastic substrate, a first organic layer is printed with a first pattern on the plastic substrate. A first inorganic layer is printed to the first organic layer, filling up openings within the first pattern of the first organic layer and covering a surface of the first organic layer. A second organic layer is printed with a second pattern on the first inorganic layer. A second inorganic layer is printed to the second organic layer, filling up openings within the second pattern of the second organic layer and covering a surface of the second organic layer.

16 Claims, 6 Drawing Sheets

Related U.S. Application Data

(60) Provisional application No. 61/122,414, filed on Dec. 15, 2008.

(51) Int. Cl.
    *B32B 3/00*           (2006.01)
    *B05D 1/36*           (2006.01)
    *B05D 1/40*           (2006.01)
    *B32B 3/10*           (2006.01)
    *B32B 7/00*           (2006.01)
    *B32B 7/04*           (2006.01)
    *B32B 3/26*           (2006.01)
    *C08J 7/04*           (2006.01)
    *B05D 7/00*           (2006.01)

(52) U.S. Cl.
    CPC .............. *B32B 7/005* (2013.01); *B32B 7/045* (2013.01); *C08J 7/04* (2013.01); *B32B 2307/7242* (2013.01); *C08J 2379/08* (2013.01); *C08J 2427/00* (2013.01); *C08J 2433/08* (2013.01); *Y10T 428/24752* (2015.01); *Y10T 428/24851* (2015.01)

(56) References Cited

U.S. PATENT DOCUMENTS

2005/0175831 A1*   8/2005  Kim ........................ B32B 33/00
                                                                                 428/323
2007/0196682 A1*   8/2007  Visser ................... H01L 23/562
                                                                                 428/594

* cited by examiner

PRINTABLE PROCESS FOR FORMING A MULTI-LAYERED GAS BARRIER LAMINATE FILM

CROSS-REFERENCE TO RELATED APPLICATION

This application is a divisional application of U.S. application Ser. No. 12/618,792, filed on Nov. 16, 2009, now allowed, which claims the priority benefit of U.S. Provisional Application Ser. No. 61/122,414, filed on Dec. 15, 2008. The entirety of each of the above-mentioned patent applications is hereby incorporated by reference herein and made a part of this specification.

BACKGROUND OF THE INVENTION

1. Field of the Invention

The present invention generally relates to a barrier film and a manufacturing method thereof. More particularly, the present invention relates to an organic/inorganic multi-layered gas barrier film and a manufacturing method thereof.

2. Description of Related Art

As the flexible substrates afford better pliability and design freedom, the flexible display panels become popular and thus quickly replace the rigid display panels. Compared with the rigid substrates, the flexible plastic substrates are cheaper, compatible with workability and safety requirements and suitable for display medium and roll-to-roll processes. However, certain drawbacks exist, including low temperature and chemical resistance, high permeability to oxygen and water vapour and large thermal expansion coefficients. Typical flexible plastic substrate has water permeation of 100~10 $g/m^2/day$ (at 25° C.), which is unable to completely prevent water vapour and oxygen permeation, thus leading to device impairment. In order to avoid water vapour and oxygen permeation, specific material is coated between the plastic substrate and the electronic devices. Such tight-sealing barrier material has to be defect-free and pinhole-free when formed as a membrane or a film, and highly transparent or no absorption to visible light. Such material can be formed as a single-layered or multilayered laminate film for gas barrier purposes.

Flexible gas barrier films include inorganic layers (of metal oxides, metal nitrides or metal oxynitrides) and organic layers. The inorganic layers provide better gas barrier capability, while the organic layers can help maintain the flexibility of the barrier film. However, conventional gas barrier structures are mainly fabricated by alternatively laminating organic/inorganic films, but the adhesion between the organic material and the inorganic material is poor. If further treatment is performed to the surface(s) of the organic or inorganic layers for improving the adhesion there-between, the production cost will be increased. Also certain defects, such as pinholes, exist in the barrier films fabricated by the vacuum processes and cause the permeation of the oxygen and water vapour, leading to degradation of the electronic device and shorter life time. Further shortcomings include high-priced apparatus or systems for the vacuum processes, low yields and difficulties in fabrication of large-sized substrates.

SUMMARY OF THE INVENTION

The present invention is directed to a manufacturing process for forming a multi-layered gas barrier laminate film, which is simple and straightforward.

The present invention provides a printable process for forming a multi-layered gas barrier laminate film by alternately forming organic layers and inorganic layers, which can help reduce the formation of pinholes.

The present invention provides a multi-layered gas barrier laminate film, comprising a flexible substrate, a plurality of organic layers disposed over the flexible substrate and a plurality of inorganic layers disposed over the flexible substrate. The organic layers and the inorganic layers are stacked in alternation, and the inorganic layers are interconnected with one another.

According to embodiments of the present invention, each of the plurality of organic layers has a pattern, and the patterns of the most adjacent two organic layers are off-set or not aligned. In this case, due to the off-set pattern designs, the inorganic material within the barrier film is three-dimensionally interconnected, and the organic material is sandwiched between the inorganic material, which improves the flexibility of the barrier film and avoids possible cracking of the barrier film.

In order to make the above and other features and advantages of the present invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
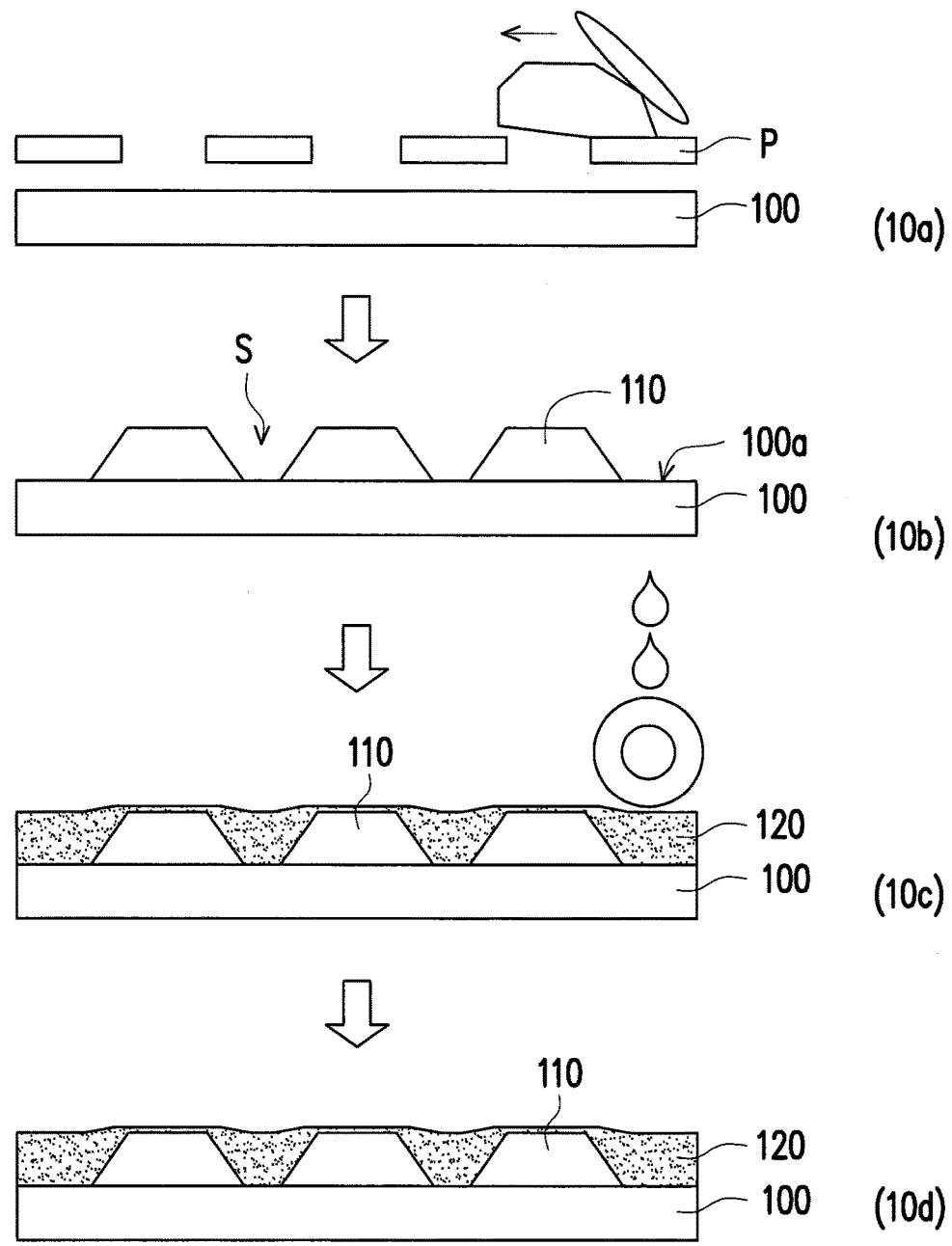
FIGS. 1A-1C describes the exemplary processes of forming an organic layer and then an inorganic layer for a barrier film according to the present invention.

Reference will now be made in detail to the present preferred embodiments of the invention, examples of which are illustrated in the accompanying drawings. Wherever possible, the same reference numbers are used in the drawings and the descriptions to refer to the same or like parts.

Figure 1B:
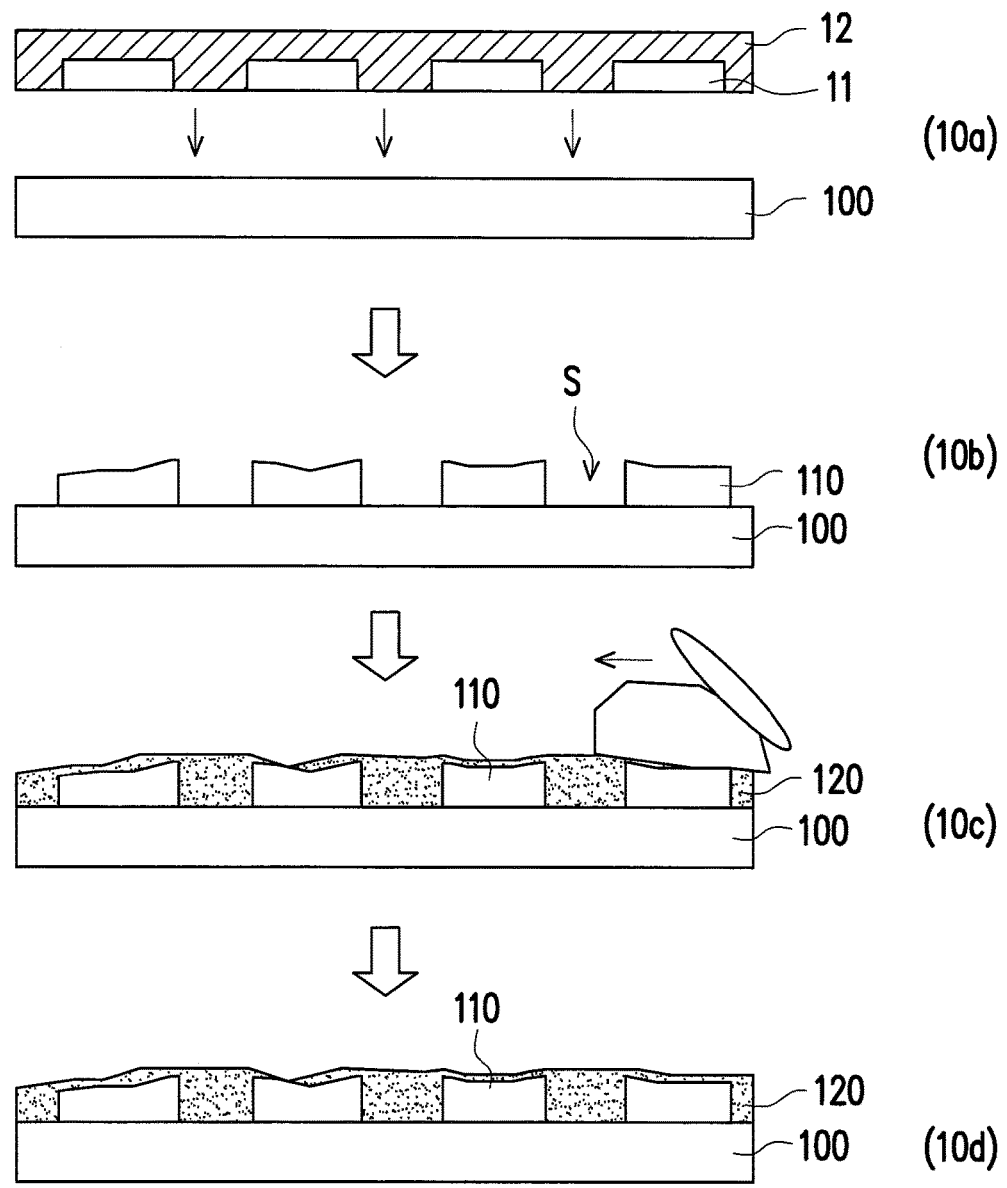
Figure 1C:
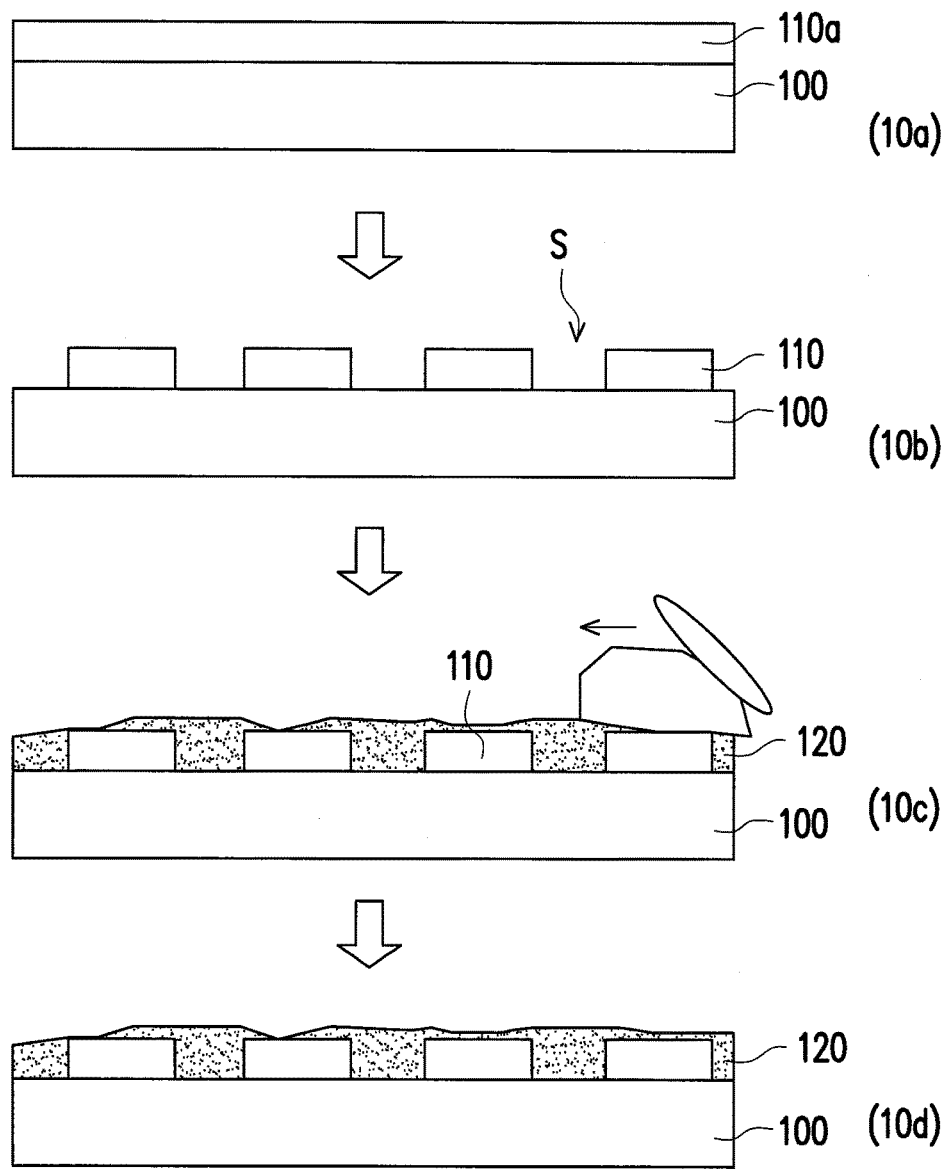

FIGS. 1A-1C describes the exemplary processes of forming an organic layer and then an inorganic layer for a barrier film according to the present invention. Following the process flow of FIG. 1A, a plastic substrate 100 is provided (Step 10a). Later, with the screen plate P, a patterned organic layer 110 (with a pattern defined by the openings S) is coated on the surface 100a of the plastic substrate 100 (Step 10b) by screen printing, for example. Subsequently an inorganic layer 120 is coated to the patterned organic layer 110, filling up the openings S of the patterned organic layer 110 and covering the whole surface of the patterned organic layer 110 (Step 10c), by roller printing, for example. Afterwards, a drying step (Step 10d) is performed to dry up the inorganic layer 120. The drying step can includes a UV-dried step, a thermal-dried step, an air-dried step and/or an electron-bean irradiation step. Such process flow can be repeated several times to form several organic layers and several inorganic layers laminated in alternation, depending on the gas barrier capability required by the products in process.

Following the process flow of FIG. 1B, a plastic substrate 100 is provided and an organic material 11 is provided to a template 12 with a pattern (Step 10a). Later, a patterned organic layer 110 is formed on the plastic substrate 100 after transferring the organic material 11 from the template 12 to the plastic substrate 100 by micro-imprinting (micro-stamping), for example (Step 10b). Subsequently an inorganic layer 120 is coated to the patterned organic layer 110, filling up the openings S of the patterned organic layer 110 and covering the whole surface of the patterned organic layer 110 (Step 10c), by Doctor blade coating or squeegee printing, for example. Afterwards, a drying step (Step 10d) is performed to dry up the inorganic layer 120. The drying step can includes a UV-dried step, a thermal-dried step, an air-dried step and/or an electron-bean irradiation step. Such process flow can be repeated several times to form several organic layers and several inorganic layers laminated in alternation, depending on the gas barrier capability required by the products in process.

Following the process flow of FIG. 1C, a plastic substrate 100 is provided and an organic layer 110a is formed on the plastic substrate 100 by, for example, spin coating (Step 10a). Later, the organic layer 110a is patterned by photolithography and wet-etching to form a patterned organic layer 110 on the plastic substrate 100 (Step 10b). Subsequently an inorganic layer 120 is coated to the patterned organic layer 110, filling up the openings S of the patterned organic layer 110 and covering the whole surface of the patterned organic layer 110 (Step 10c), by doctor blade coating or squeegee printing, for example. Afterwards, a drying step (Step 10d) is performed to dry up the inorganic layer 120. The drying step can includes a UV-dried step, a thermal-dried step, an air-dried step and/or an electron-bean irradiation step. Such process flow can be repeated several times to form several organic layers and several inorganic layers laminated in alternation, depending on the gas barrier capability required by the products in process.

Preferably, either the organic layer or the inorganic layer of the present invention is formed by the so-called totally printable process. The totally printable process may include screen printing technology, doctor blade coating (without the screen plate), squeegee printing, roll coating, micro (or nano)-imprinting, spray printing, spin coating, flow coating, capillary coating, chemical coating and dip or immersion coating. Such totally printable process is simple, low-cost and is able to form a single layer with pattern (or without pattern) in one step. Due to the lamination of the organic layer(s) and the inorganic layer(s), the pinholes of the previously-formed layer can be greatly reduced or compensated by the fluidity of the later-formed layer.

The material of the plastic substrate can be polyethylene terephthalate (PET), polycarbonate (PC), polymethylmethacrylate (PMMA), polyvinylchloride (PVC), polyimide (PI) or polyethylene (PE), for example.

The organic material suitable for the above processes can be macromolecules or polymers with low film-forming temperature and high light transparency, such as, optical grade polymethylmethacrylate (PMMA), poly-p-xylene, poly-p-xylene, ethylene-chlorotrifluoroethylene copolymer, fluorinated ethylene-propylene, fluorinated ethers, polytetrafluoroethene, polychlorotrifluoroethylene, polyimide precursors, self-assembly materials or light sensitive materials. The organic material may further includes absorbent or desiccant additives, such as $NaBH_4$, $CaCl_2$, silica gel, and CaO. The organic material may further include nano-particles of aluminium oxide, zinc oxide or silver, for increasing the barrier capability.

The inorganic material suitable for the above process can be sol-gel materials of gas barrier capability, silicon oxide or metal oxides, such as titanium oxide, tin oxide, aluminium oxide or zinc oxide.

The organic material used for the organic layer can be the same or different between layers. Similarly, the inorganic material used for the inorganic layer can be the same or different between layers.

Figure 2A:
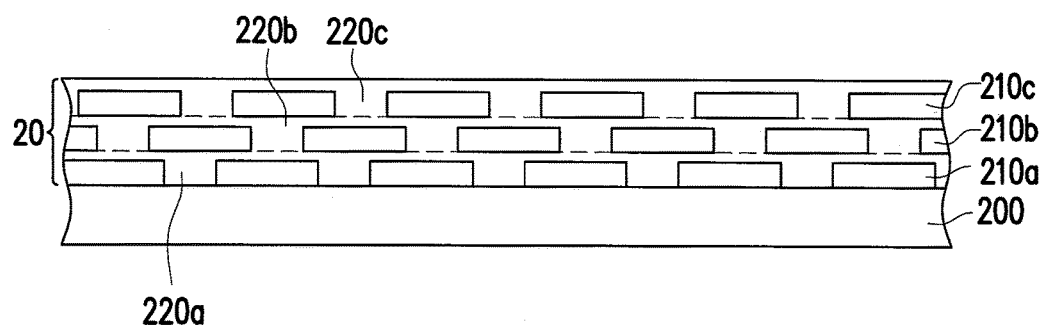
FIG. 2A is a schematic cross-sectional view illustrating the barrier film according to an embodiment of the present invention.
Figure 2B:
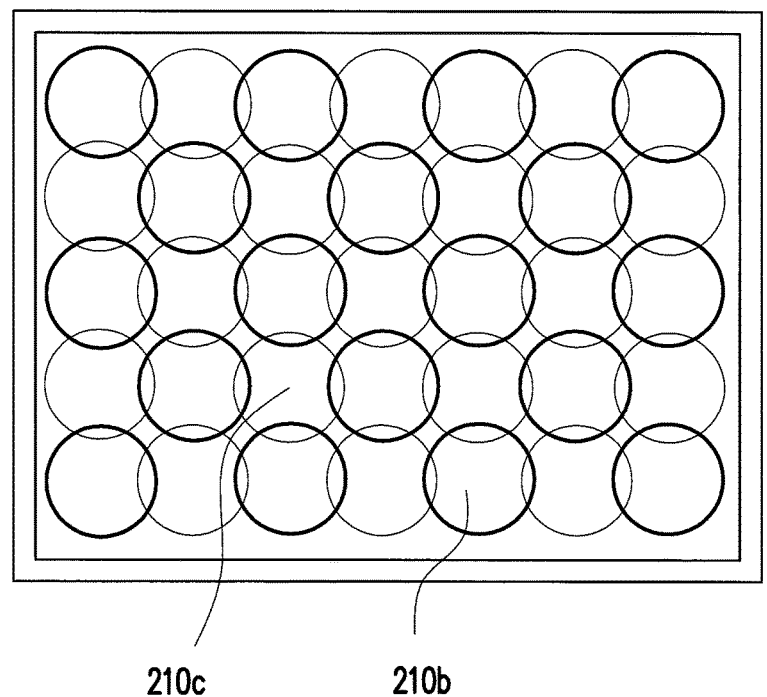
FIG. 2B is an exemplary top view of the barrier film according to an embodiment of the present invention.

FIG. 2A is a schematic cross-sectional view illustrating the barrier film according to an embodiment of the present invention, while FIG. 2B is an exemplary top view of the barrier film.

In FIG. 2A, three layers of patterned organic layers 210a, 210b and 210c and three layers of inorganic layers 220a, 220b and 220c are stacked in alternation and disposed on the substrate 200. Within the laminate film 20, the inorganic layers 220a/220b/220c are interconnected with one another and become a continuous matrix structure. Due to the patterned organic layer formed by printing process, the inorganic material within the laminate film is interconnected and becomes continuous throughout layers for better gas barrier efficiency. Hence, the adhesion between the organic and inorganic layers is increased and peeling between the organic and inorganic layers is decreased.

From FIG. 2B, the patterned organic layers 210a, 210b and 210c are shown as round blocks arranged in stagger. However, the shape or design of the pattern of the organic layer is not limited by the embodiments provided herein. Preferably, the patterns of the most adjacent two organic layers are staggered or complement to each other. At least, the patterns of the most two adjacent two organic layers are not aligned or are off-set. In this case, due to the off-set pattern designs, in the vertical direction of the barrier film, the inorganic material within the barrier film is not directly piled on each other, and the organic material is sandwiched between the inorganic material, which improves the flexibility of the barrier film and avoids possible cracking of the barrier film.

Macroscopically, the inorganic material within the laminate film can be regard as an interconnected matrix or web structure, while the unconnected organic material distributed within the continuous inorganic material can help enhance the pliability and flexibility of the laminate film.

Conventionally, in order to enhance gas barrier capability, the thickness of the inorganic layer needs to be increased or more inorganic layers are required. But the thicker the inorganic layer, more fragile the inorganic layer is, when outer force is applied. However, due to the off-set pattern arrangement between the layers, the thickness of the inorganic layers is not diametrically accumulated but the permeation pathway for water or oxygen gas becomes meandering and is extended in this regard.

Figure 3A:
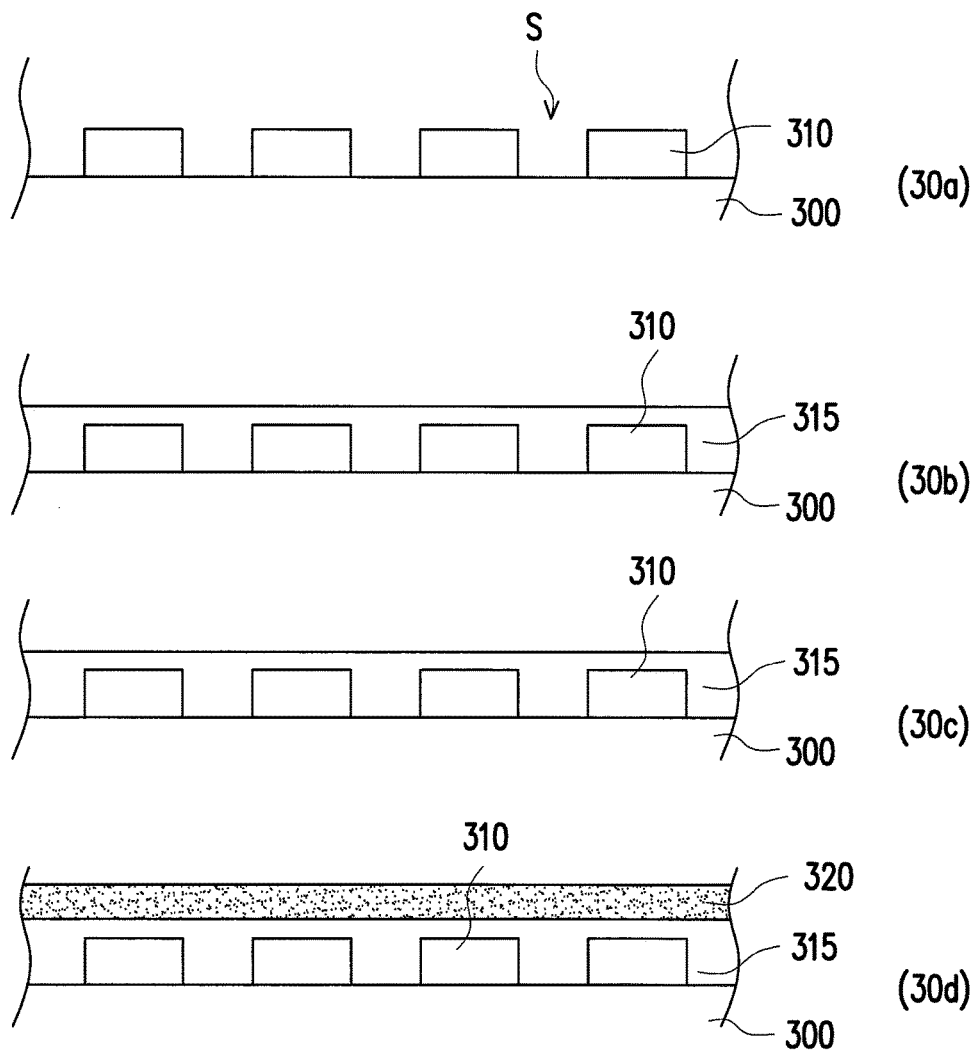
FIGS. 3A-3B describes the exemplary processes of forming a mixture layer for a barrier film according to the present invention.
Figure 3B:
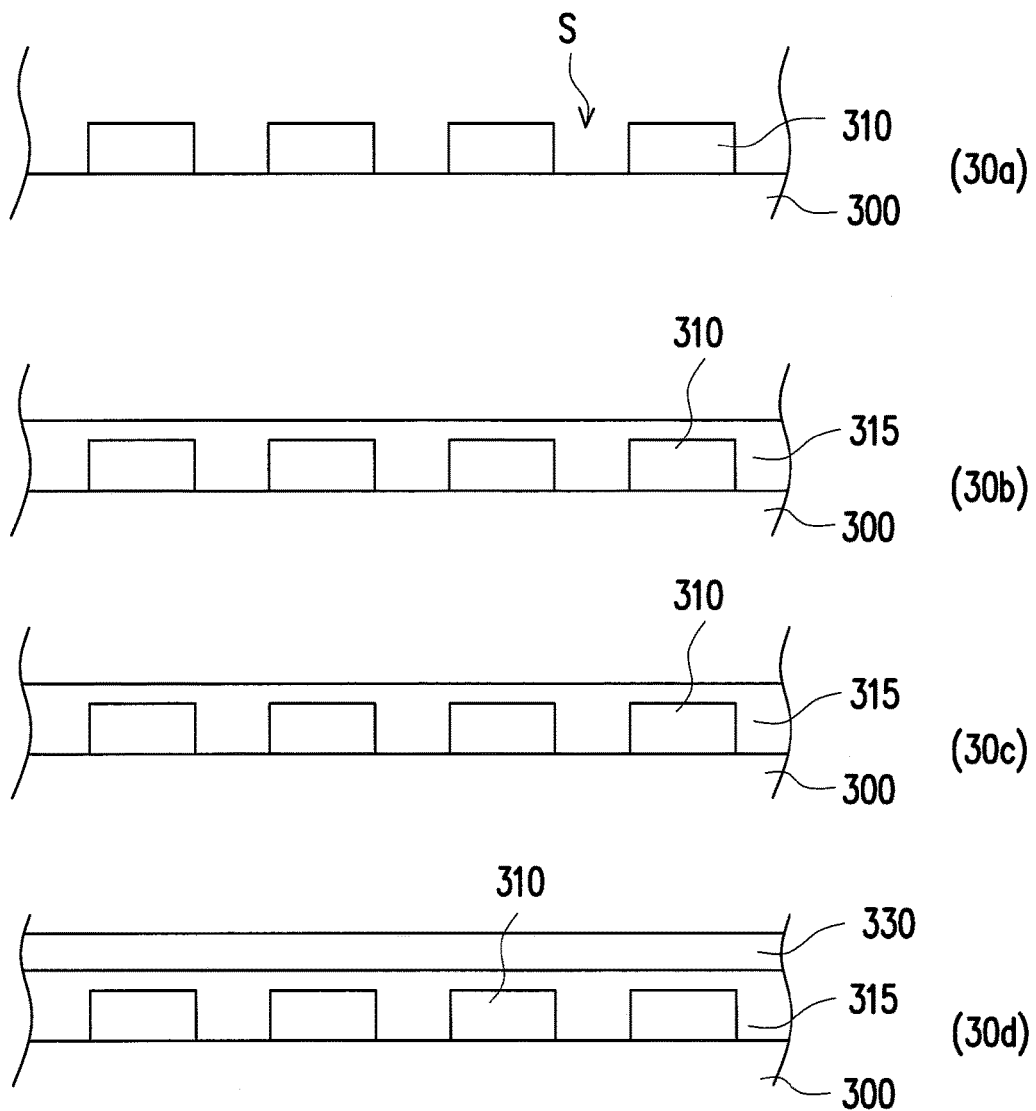

In addition to the exemplary processes of forming an organic layer and then an inorganic layer for the barrier film, an organic/inorganic hybrid layer can be formed after forming the organic layer and before forming the inorganic layer. FIGS. 3A-3B describes the exemplary processes of forming a mixture layer for a barrier film according to the present invention.

Following the process flow of FIG. 3A, a plastic substrate 300 is provided and a patterned organic layer 310 is formed on the plastic substrate 300 (Step 30a). Subsequently an organic/inorganic hybrid layer 315 is coated to the patterned organic layer 310, filling up the openings S of the patterned organic layer 310 and covering the whole surface of the patterned organic layer 310 (Step 30b), by slot-die coating. Afterwards, a drying step (Step 30c) is performed to dry up the mixture layer 315. Later, an inorganic layer 320 is coated over the mixture layer 315 (Step 30d). Such process flow can be repeated several times to form the laminate film, depending on the gas barrier capability required by the products in process. The organic/inorganic hybrid layer is selected from silicon-containing, titanium-containing or aluminium-containing hybrid materials, for example. The organic/inorganic hybrid layer can level the organic layers, and the organic/inorganic hybrid layer has gas barrier capability.

Following the process flow of FIG. 3B, Steps 30a-30c are the same as described in FIG. 3A, while in Step 30d, another organic layer 330 is coated on the mixture layer 315.

Example

Over a transparent polyimide (PI) substrate, an organic acrylate-based photoresist layer of about 1 micron thickness is spin coated to the PI substrate. After soft baking at 90° C., exposure energy 500 mJ/cm$^2$ and 220° C. hard baking, a transparent organic layer is obtained. Subsequently, a inorganic layer, made of silicon-containing sol-gel material (IC1-200), of about 300 nm thickness is spin coated over the patterned organic layer and then is dried at 100° C. for 10 minutes and 220° C. for 30 minutes to remove the solvent. Later, another organic acrylate-based photoresist layer of about 1 micron thickness is spin coated to the mixture layer. After soft baking at 90° C., exposure energy 500 mJ/cm$^2$ and 220° C. hard baking, another transparent organic layer is formed and the laminate film is obtained. Such gas barrier substrate has water vapour transmission rate (WVTR) value of $10^{-1}$ g/m$^2$/day under 25° C. and 60% relative humidity.

The process provided by the present invention preferably applies the totally printing process to fabricate the organic/inorganic multi-layered gas barrier film. As one printing step can achieve patterning and coating at the same time, the process is simplified with lower costs. Through the pattern design (e.g. off-set pattern) of the organic layer and the alternate or complementary arrangement of the patterned organic layer and the adjacent inorganic layer, the inorganic material is interconnected between layers and the vertical diffusion pathway of the gas is elongated, thus improving the gas barrier efficiency. In addition, the continuous inorganic material matrix alleviates the peeling between layers of different materials, further improving the adhesion between the organic and inorganic layers.

By using the totally printable process, it is easier to fabricate large sized gas barrier film for flexible substrates. Moreover, such process can improve the gas barrier capability and flexibility of the substrate for application in flexible touch panel.

Compared with the commonly used vacuum process, the costs for either the applicable materials or the working apparatus/equipments of the present invention are lower.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A process for forming a multi-layered gas barrier laminate film, comprising:

providing a plastic substrate;
coating a first organic layer having a first pattern with first openings on the plastic substrate;
coating a first organic/inorganic hybrid layer on the first organic layer, filling up the first openings of the first organic layer and fully covering a top surface of the first organic layer; and
coating a first inorganic layer to cover the first organic/inorganic hybrid layer, wherein the first organic/inorganic hybrid layer and the first inorganic layer are interconnected with one another.

2. The process as claimed in claim 1, further comprising coating a second organic layer having a second pattern with second openings on the first inorganic layer.

3. The process as claimed in claim 2, further comprising coating a second organic/inorganic hybrid layer on the second organic layer, filling up the second openings of the second organic layer and covering a top surface of the second organic layer.

4. The process as claimed in claim 3, further comprising coating a second inorganic layer to cover the second organic/inorganic hybrid layer.

5. The process as claimed in claim 2, wherein a material of the first or second organic layer is optical grade polymethylmethacrylate, poly-p-xylene, ethylene-chlorotrifluoroethylene copolymers, fluorinated ethylene-propylene, fluorinated ether, polytetrafluoroethene, polychlorotrifluoroethylene, a polyimide precursor, a self-assembly material or a light sensitive material.

6. The process as claimed in claim 2, wherein a material of the first or second organic layer further includes nanoparticles of aluminium oxide, zinc oxide or silver.

7. The process as claimed in claim 4, wherein a material of the first or second inorganic layer includes silicon oxide ($SiO_2$), titanium oxide ($TiO_2$), tin oxide ($SnO_2$), aluminum oxide ($Al_2O_3$) or zinc oxide (ZnO).

8. The process as claimed in claim 3, wherein a material of the first or second organic/inorganic hybrid layer is a silicon-containing hybrid material, a titanium-containing hybrid material or an aluminium-containing hybrid material.

9. A process for forming a multi-layered gas barrier laminate film, comprising:

providing a plastic substrate;
coating a first organic layer having a first pattern with first openings on the plastic substrate;
coating a first organic/inorganic hybrid layer on the first organic layer, filling up the first openings of the first organic layer and covering a top surface of the first organic layer; and
coating a second organic layer to cover the first organic/inorganic hybrid layer, wherein the first organic/inorganic hybrid layer and the second organic layer are interconnected with one another, and the second organic layer is a continuous layer.

10. The process as claimed in claim 9, further comprising coating a third organic layer having a second pattern with second openings on the second organic layer.

11. The process as claimed in claim 10, further comprising coating a second organic/inorganic hybrid layer on the third organic layer, filling up the second openings of the third organic layer and covering a top surface of the third organic layer.

12. The process as claimed in claim 11, further comprising coating a fourth organic layer to cover the second organic/inorganic hybrid layer.

13. The process as claimed in claim 12, wherein the step of coating the first, second, third or fourth organic layer comprises performing a screen printing process, a doctor blade coating process, a roll coating process, a micro-imprinting process, a spray coating process, a dip coating process, a spin coating process, a slot-die coating process, a flow coating process, a capillary coating process, a chemical coating process or combinations thereof.

14. The process as claimed in claim 12, wherein a material of the first, second, third or fourth organic layer is optical grade polymethylmethacrylate, poly-p-xylene, ethylene-chlorotrifluoroethylene copolymers, fluorinated ethylene-propylene, fluorinated ether, polytetrafluoroethene, polychlorotrifluoroethylene, a polyimide precursor, a self-assembly material or a light sensitive material.

15. The process as claimed in claim 12, wherein a material of the first, second, third or fourth organic layer further includes nano-particles of aluminium oxide, zinc oxide or silver.

16. The process as claimed in claim 11, wherein a material of the first or second organic/inorganic hybrid layer is a silicon-containing hybrid material, a titanium-containing hybrid material or an aluminium-containing hybrid material.

* * * * *